Figure 1:
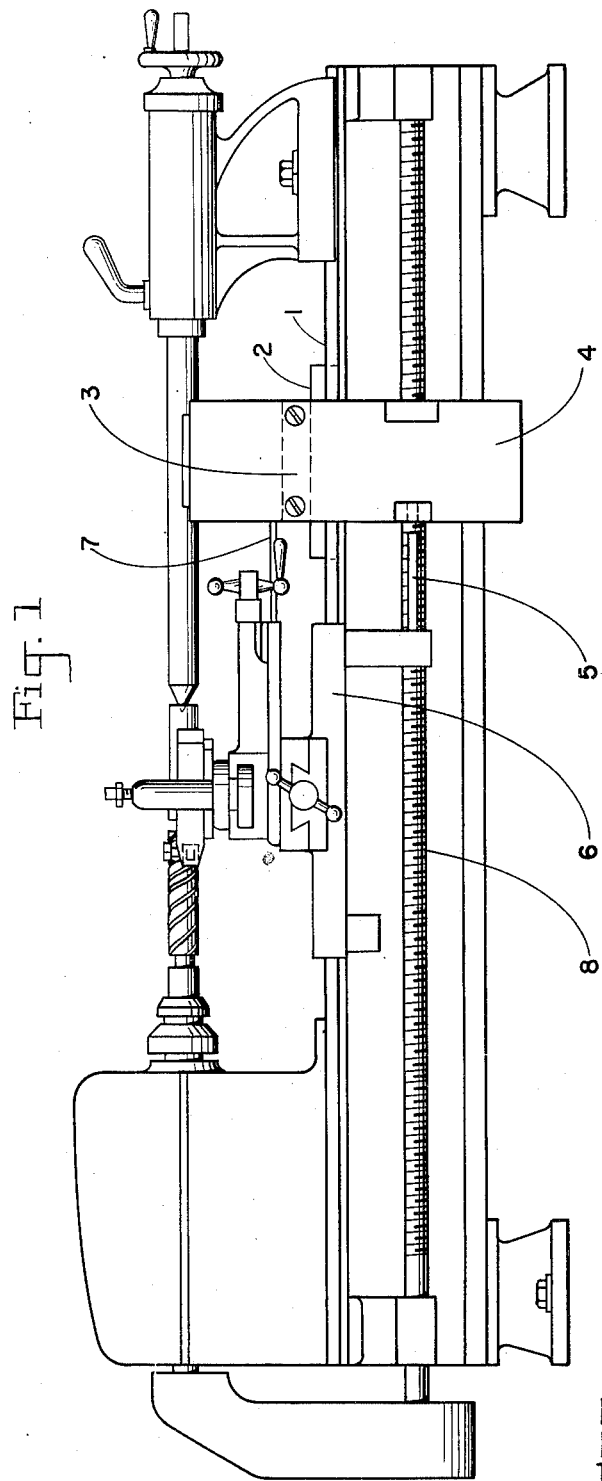

July 17, 1956  G. SHAPIRO ET AL  2,754,711
SCREW CUTTING ATTACHMENT

Filed Sept. 25, 1951  3 Sheets-Sheet 2

INVENTOR.
GUSTAVE SHAPIRO
ROBERT O. STONE
ROBERT L. HENRY
By *G. J. Schmitt*
*Walter S. Paul* ATTORNEYS July 17, 1956  G. SHAPIRO ET AL  2,754,711
SCREW CUTTING ATTACHMENT
Filed Sept. 25, 1951  3 Sheets-Sheet 3
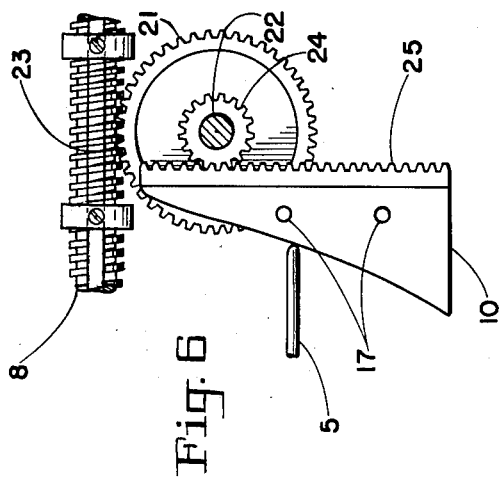
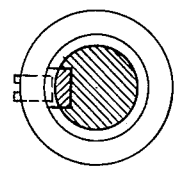
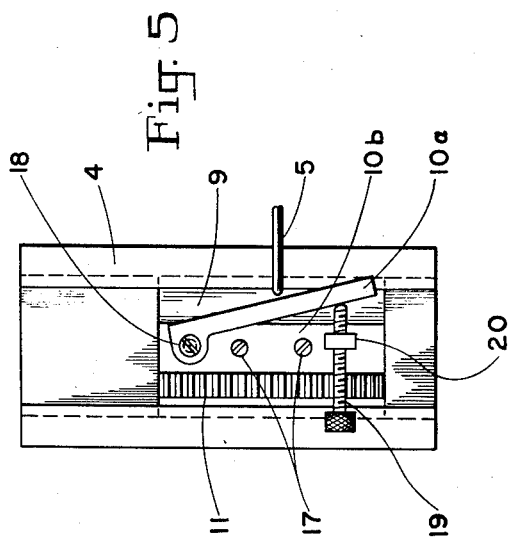
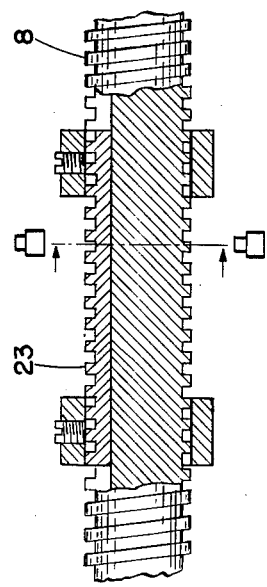
INVENTOR.
GUSTAVE SHAPIRO
ROBERT D. STONE
ROBERT L. HENRY

United States Patent Office 2,754,711
Patented July 17, 1956

2,754,711

SCREW CUTTING ATTACHMENT

Gustave Shapiro and Robert O. Stone, Washington, D. C., and Robert L. Henry, Montgomery County, Md.

Application September 25, 1951, Serial No. 248,262

2 Claims. (Cl. 82—5)

(Granted under Title 35, U. S. Code (1952), sec. 266)

This invention relates to improvements in screw-cutting lathes, and more particularly to the provision of auxiliary means attached to a conventional lathe for varying the rate at which the carriage moves along the bed of the lathe.

Previous efforts to provide a means of increasing the variety of screw threads which may be cut on screw-cutting lathes have had inherent disadvantages. In some cases these devices are intended to be incorporated in the lathe as it is initially constructed, rendering it more complex and more expensive. Moreover, such devices cannot readily be incorporated in an existing lathe without extensive alteration of the lathe itself. Other of these devices have been designed as attachments for existing lathes of standard construction. However, such attachments are relatively complex and they also necessitate permanent alterations of the basic lathe structure in addition to the incorporation of the attachment.

The device which constitutes the embodiment of the instant invention is an attachment which can readily be secured to the bed of a conventional screw-cutting lathe without permanently altering any part of the lathe itself, wherein said attachment includes a readily detachable cam plate movable in response to rotation of the lathe lead screw and a cam follower connected to the lathe carriage so that the carriage will move at a rate determined by the shape of the detachable cam plate. With this attachment any desired linear or non-linear screw thread can be produced by inserting the appropriate cam in the attachment. Moreover, this attachment comprises relatively few parts, all simple and inexpensive to make and easily installed on a lathe, and the arrangement of these parts facilitates the process of changing the cams.

The object of the present invention is to provide a means for modifying a conventional screw-cutting lathe by means of a compact and easily installed attachment so that it will cut a wide variety of screw threads, both linear and non-linear.

Another object is to provide a means of rendering a conventional screw-cutting lathe capable of producing screws with non-linear threads of any desired proportions.

Still another object is to provide a means of modifying a conventional screw-cutting lathe so that it can be quickly and easily adjusted to produce screws with linear threads having pitches not obtainable with the standard gear sets generally available for use with screw-cutting lathes.

Figure 2:
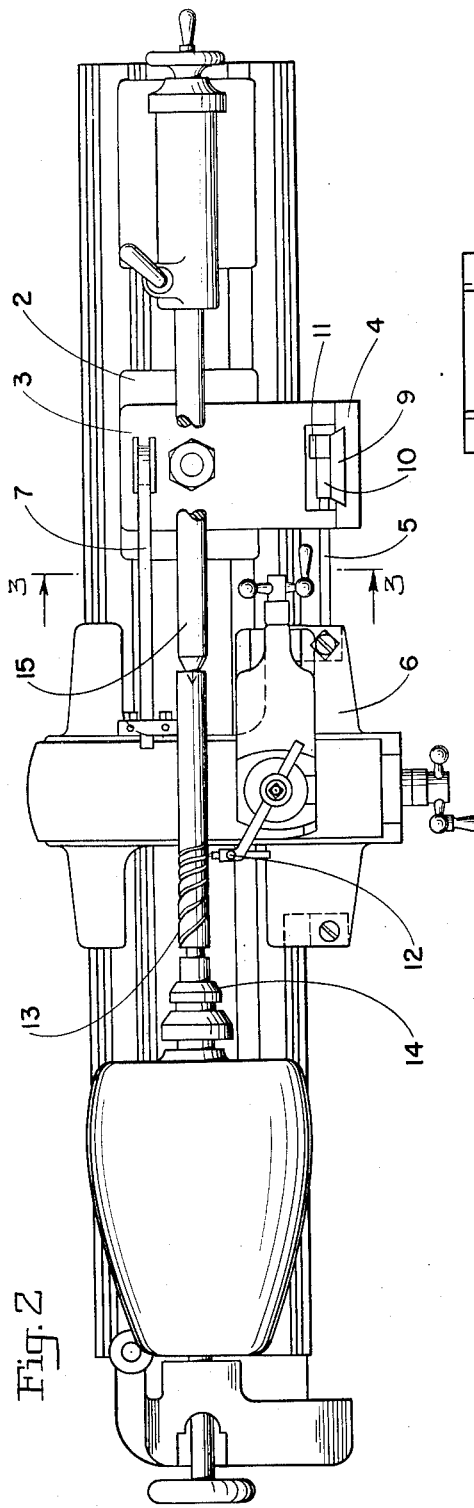
Figure 4:
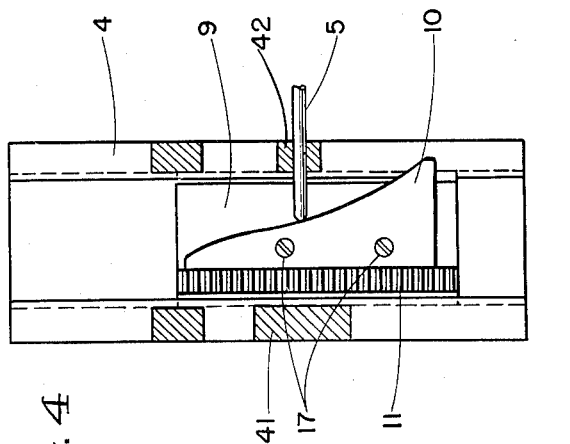
Figure 3:
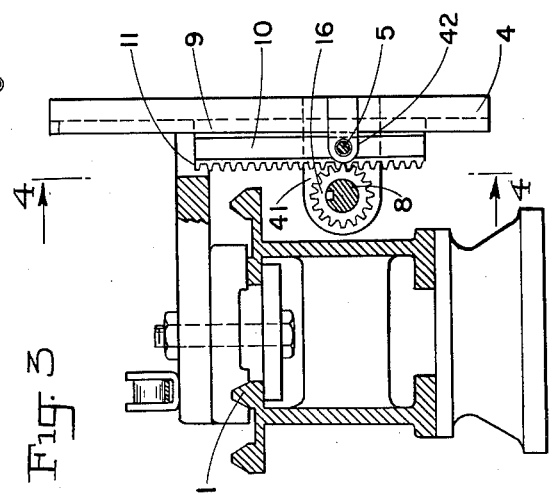

Other objects and many of the attendant advantages of this invention will be readily appreciated as the same becomes better understood by reference to the following detailed description when considered in connection with the accompanying drawings wherein:

Fig. 1 is a side elevation of a conventional screw-cutting lathe fitted with one form of the attachment disclosed herein, Fig. 2 is a plan view of the lathe and attachment shown in Fig. 1, Fig. 3 is a cross section taken on line 3—3 of Fig. 2 showing an end view of the cam mechanism embodied in the attachment disclosed herein, Fig. 4 is a cross section taken on the line 4—4 of Fig. 3, showing a side view of the cam mechanism arranged to cut non-linear threads, Fig. 5 is a cross section showing a view similar to that of Fig. 4, but of a modification of the cam mechanism arranged to cut linear threads and adjustable to various thread pitches, Fig. 6 shows a modification of the cam drive in which the rack is moved by a pinion rotated with a worm gear driven by the lead screw instead of by a pinion mounted directly on the lead screw, Fig. 7 is an enlarged detail view of part of the cam drive arrangement shown in Fig. 6, and Fig. 8 is a cross section taken on line 8—8 of Fig. 7.

Referring now to the drawings, in which like reference numerals are used to designate like parts, and first to Fig. 1 in particular, a conventional screw-cutting lathe has attached to its bed 1 an attachment base plate 2, on which is mounted a cross support 3, which supports an upright slide guide 4 located adjacent to the lead screw 8, the function of said guide 4 will be described in detail subsequently, in connection with other figures. A cam follower 5 is directly connected in fixed relation to the carriage 6, as shown. A carriage return means 7 may be mounted on the lathe bed 1 and attached to the carriage 6 to urge the carriage in a direction away from the headstock of the lathe. This carriage return means may take any desired form such as a constant tension spring or a pulley and a suspended weight. The carriage return means is shown in Fig. 1 and more fully in Fig. 2, where the showing represents a spring. In Fig. 1, the apron assembly normally suspended from the carriage of a conventional screw-cutting lathe on the side adjacent to the lead screw has not been shown for two reasons; first, because this omission facilitates a clear showing of the novel features of the device disclosed herein; and second, because this apron can conveniently be removed when a screw-cutting lathe is to be operated with the attachment described below. However, this attachment may also be used with the apron in place on the carriage, to produce the same satisfactory results.

Referring now to Fig. 2, a vertical slide 9 is held in the ways of slide guide 4. Affixed to slide 9 are a detachable cam 10 and a rack 11 which is driven by a pinion as shown in Fig. 3 and described in connection therewith. A conventional thread-cutting tool 12 is mounted on the carriage 6, and cuts a thread in the work 13, held between the headstock 14 and the tailstock 15.

With reference to Fig. 3, a pinion gear 16 is installed on lead screw 8 for rotation therewith. Said pinion is arranged to mesh with rack 11. Thus, when the screw 8, as shown in Fig. 3, is rotated in a counterclockwise direction, the pinion 16 will move the rack 11, and hence cam 10, upwardly. Conversely, the rack 11 will be moved downwardly if the lead screw 8 is rotated in the opposite direction. Projection 41 extending from the side of slide guide 4 nearest to rack 11 provides a bearing for local support of the lead screw 8. Projection 42 extending from the side of the slide guide 4 adjacent to the detachable cam 10 restrains the cam follower 5 against movement except in the desired direction longitudinally of the lathe bed 1.

Fig. 4 shows the relationship of the rack 11 to the detachable cam 10 and also shows the disposition of the cam follower 5 relative to the cam 10. Screws 17 represent one suitable means of mounting the detachable cams 10 on slide 9. The particular cam illustrated in Fig. 4 represents one form of cam for cutting a non-linear screw thread.

In view of the showing in Figs. 1 through 4 and the above description, it should be apparent that the device thus described provides an uncomplicated arrangement whereby the movement of the lead screw 8 is transmitted indirectly to the carriage 6 through cam 10 and cam follower 5 so that the rate of movement of the carriage along the bed 1 is varied in accordance with variations in the shape of the cam.

Fig. 5 illustrates a modification of the attachment in which the slide guide 4, the slide 9 and the rack are the same as shown in Fig. 4, while the shaped cam has been replaced with a straight bar 10a pivotally mounted on a shaft 18 extending from a base plate 10b attached to slide 9 by means of screws 17. The slope of the cam face formed by bar 10a is regulated by means of adjusting screw 19 supported in mounting lug 20 on the base plate 10b. Accordingly the base plate 10b and the bar 10a together form an adjustable cam. With this modification of the cam the attachment disclosed herein may be used for cutting linear screw threads of any desired pitch angle by setting the adjusting screw 19.

A different type of cam driving means is disclosed in the modification of the attachment shown in Fig. 6 which includes a worm gear 21 rotatably mounted on a shaft 22 secured in fixed relation to the bed 1 of the lathe. This worm gear is driven by the lead screw 8. Where the lead screw has a longitudinal slot along its length, the section of this slot adjacent to the worm gear may be filled by a strip 23 shaped to fit the slot and bearing a series of thread segments matching the threads on the lead screw, as shown in detail in Figs. 7 and 8. There is a pinion 24 connected to worm gear 21 and mounted coaxially therewith on shaft 22. Pinion 24 engages a vertical rack 25 connected to and movable with vertically sliding cam 10.

From the foregoing description, it will be seen that the cutting tool of a conventional screw-cutting lathe equipped with the attachment described herein can be caused to follow any desired cutting path along suitably shaped work mounted in the lathe. The path followed by the tool will of course be determined by the shape of the detachable cam installed in the attachment.

Obviously many other modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. For use with a conventional lathe having a bed, a carriage slidably mounted on the bed, a tool holder mounted on said carriage, a head stock and tail stock mounted on the bed, a feed screw extending lengthwise of the bed and drive means for said feed screw, an attachment for producing non-linear movement of said carriage comprising a base plate detachably mounted on said bed, a vertical support fixed on said base plate, a pair of vertically disposed parallel guides integrally mounted on said vertical support, a slide member arranged on said vertical support between said guides, a rack gear mounted vertically on said slide, a cam detachably mounted on said slide, a spring, one end of said spring fixedly mounted on said base plate, the other end of said spring adapted for attachment to said carriage so as to bias said carriage toward said attachment, a cam follower, one end of said cam follower adapted for attachment to said carriage, the other end of said cam follower arranged to bear against said cam surface, and gear means on said support coupling said feed screw to said rack gear.

2. For use with a conventional lathe having a bed, a carriage slidably mounted on said bed, a tool holder mounted on said carriage, a head stock and tail stock mounted on the bed, a feed screw extending laterally of the bed at the front of the lathe, and means for driving said feed screw and head stock, an attachment for producing non-linear movement of the carriage comprising an attachment base plate adapted to be removably mounted on the bed of a lathe, a slide guide supported by said attachment base plate, said slide guide, when mounted on a lathe, lying in a vertical plane in front of the lathe adjacent the lead screw thereof, a slide adapted to slide in said slide guide in a vertical plane, a rack on said slide, means for operatively interconnecting the rack and the lead screw of a lathe whereby movement of the lead screw produces movement of the slide in said slide guide, a cam means removably secured to said slide for movement therewith, and a cam follower disposed in engagement with said cam means and adapted to be supported in fixed relation to the carriage of a lathe, whereby when said attachment is associated with a lathe, movement of the lead screw thereof is transmitted through a properly selected cam means to produce a desired movement of the lathe carriage.

References Cited in the file of this patent

UNITED STATES PATENTS

| | | |
|---|---|---|
| 510,329 | Davidsohn | Dec. 5, 1893 |
| 1,371,544 | Becker | Mar. 15, 1921 |
| 2,469,262 | Eggers | May 3, 1949 |
| 2,566,116 | Chang | Aug. 28, 1951 |

FOREIGN PATENTS

| | | |
|---|---|---|
| 423,570 | France | Apr. 21, 1911 |
| 579,470 | Germany | June 27, 1933 |